(No Model.)
H. LISTERUD.
PLOW ATTACHMENT.
No. 309,552. Patented Dec. 23, 1884.
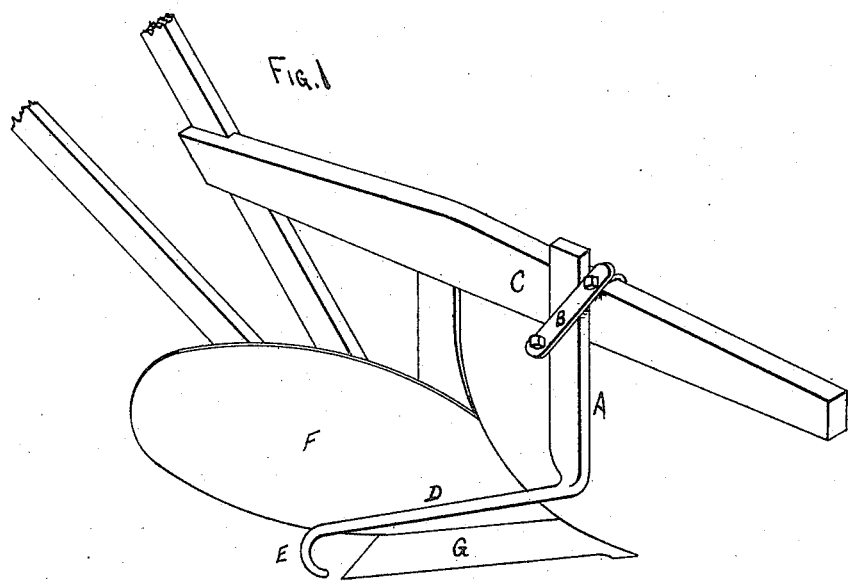
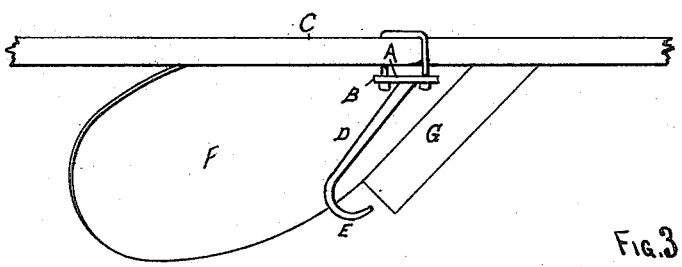
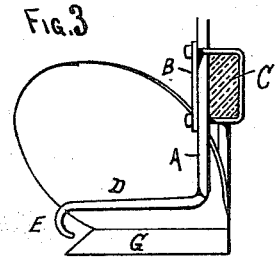

UNITED STATES PATENT OFFICE.

HANS LISTERUD, OF SACRED HEART, MINNESOTA.

PLOW ATTACHMENT.

SPECIFICATION forming part of Letters Patent No. 309,552, dated December 23, 1884.

Application filed August 16, 1884. (No model.)

*To all whom it may concern:*

Be it known that I, HANS LISTERUD, a subject of the King of Norway and Sweden, (having declared my intention of becoming a citizen of the United States,) and a resident of Sacred Heart, county of Renville, and State of Minnesota, have invented certain new and useful Improvements in Plow Attachments, of which the following specification is a full, clear, and exact description, reference being also had to the accompanying drawings, in which—

Figure 1 is a perspective view of a portion of a plow with my improvement attached to its beam. Fig. 2 is a plan view of the same. Fig. 3 is a sectional front view.

In "breaking" new land, and under some conditions in plowing old land, a thick tough sod is met with, which gives considerable trouble to the farmer, as portions of the edge of the furrows remain above the surface; and to turn the edges of these lines of sod over and bury them beneath the overturned soil is the object of my invention.

The plow attachment or device which constitutes my invention has substantially the following construction: It has a vertical part or bar, A, by which it is attached rigidly and strongly to the beam C of a plow by means of a suitable clip, B, or its equivalent. From the attaching part A an arm, D, extends backward and outward obliquely over the forward part of the mold-board of the plow, and may incline a little downward and outward. This arm terminates at its outer end in a hook, E, which forms the essential part of the invention, for the purpose specified. It is curved forward and downward, and at its lower end is again recurved, or curved inward and downward, so as to reach around the edge of the furrow-slice. It is situated over the forward part of the mold-board, just in front of where the furrow-slice begins to be raised and turned, so that it may be disturbed from its proper position as little as possible by the up-and-down and lateral motions of the forward end of the plow-beam. The rod D is so set as to come over the mold-board F and share G in the proper position for the hooked end E to catch the edge of the sod as it is turned up by the share and mold-board and turn it under, so that it will all be covered by the next furrow and leave no part exposed. The recurved hook E is intended to bend around the edge of the furrow-slice, and thereby to completely trim off the jagged edge thereof, while the forward and downward inclination of the hook enables it to catch under the said jagged edge and to cut it off for burying the same in the adjacent furrow. By this simple device the sod is all completely covered and soon decays, and is thus out of the way of all further power to annoy.

I prefer to form the device in one solid piece, as it is both cheaper and stronger, and can be so proportioned that each part will bear its own proper degree of strains, and thus not be easily broken or displaced. Since this attachment is required to have considerable strength and rigidity, the vertical part A should have comparatively great width, and the part D should be especially strong next to the attaching part; but it may taper toward the outer end, as shown.

The bar A D E may be made of wrought or malleable iron instead of steel, if preferred.

In center-draft plows the bar A may be joined to the bar D at a point nearer the hooked end E.

I am aware that weed and stubble turning devices of various constructions have been applied to plow-beams; but none of them, so far as I am aware, are capable of trimming the jagged edges of furrow-slices, nor are any of them constructed like my plow attachment.

I claim as my invention—

The combination, with a plow, of a furrow-slice trimming attachment formed with a recurved forwardly and downwardly inclined hook, E, substantially as herein specified.

In testimony whereof I have hereunto set my hand in presence of two subscribing witnesses.

HANS LISTERUD.

Witnesses:
HANS GRONNERUDD,
PETER B. OLSON.